(12) United States Patent
Reilly (10) Patent No.: US 10,925,276 B2
(45) Date of Patent: Feb. 23, 2021

(54) TELLTAIL RODENT TRAP (71) Applicant: Bret Christopher Reilly, Irvington, NY (US)

(72) Inventor: Bret Christopher Reilly, Irvington, NY (US)

(*) Notice: Subject to any disclaimer, the term of this patent is extended or adjusted under 35 U.S.C. 154(b) by 191 days.

(21) Appl. No.: 15/732,406

(22) Filed: Nov. 7, 2017

(65) Prior Publication Data
US 2018/0146657 A1 May 31, 2018

Related U.S. Application Data (60) Provisional application No. 62/497,681, filed on Nov. 29, 2016.

(51) Int. Cl.
*A01M 23/24* (2006.01)
*A01M 31/00* (2006.01)

(52) U.S. Cl.
CPC .......... *A01M 23/24* (2013.01); *A01M 31/002* (2013.01)

(58) Field of Classification Search
CPC ...... A01M 23/00; A01M 23/24; A01M 23/26; A01M 23/28; A01M 23/30; A01M 31/002
USPC ........ 43/58, 81, 81.5, 82, 83, 88, 90, 92–97, 43/52, 135
See application file for complete search history.

(56) References Cited

U.S. PATENT DOCUMENTS

| | | | |
|---|---|---|---|
| 4,310,984 A * | 1/1982 | Brubaker, Jr. ........ | A01M 23/20 43/61 |
| 5,267,411 A * | 12/1993 | Phillips ................. | A01M 23/30 43/81 |
| 5,588,249 A * | 12/1996 | Flinner ................. | A01M 23/20 43/61 |
| 6,574,912 B1 * | 6/2003 | Johnson ................ | A01M 23/26 43/58 |
| 2003/0110679 A1 * | 6/2003 | Collins ................. | A01M 23/36 43/81 |

(Continued)

FOREIGN PATENT DOCUMENTS

| DE | 10-2012-013-138 A1 | 12/2013 |
|---|---|---|
| DE | 102012013138 | * 1/2014 |

(Continued)

OTHER PUBLICATIONS

Non Provisional Utility Application From U.S. Appl. No. 62/497,681, filed Nov. 29, 2016.

*Primary Examiner* — Joshua J Michener
*Assistant Examiner* — Arfan Y. Sinaki
(74) *Attorney, Agent, or Firm* — Studebaker & Brackett PC (57) ABSTRACT

Telltale rodent trap for trapping rodents in interior walls, ceilings and similar spaces including a baited and set spring-loaded trap attached to a base plate passing through a wall or ceiling opening to be exposed to interior spaces frequented by rodents. A cover plate having a telltale aperture fits over the opening. An elongated telltale is attached at one end to a trap arm pivoting between a first position when the trap is set and a second position when the trap is sprung. The other end of the elongated telltale is inserted between the cover and base plates and is visible in the telltale aperture of the cover plate. When the trap is sprung, the trap arm pulls the elongated telltale so it is no longer visible in the telltale aperture indicating that a rodent has been trapped and the trap assembly should be removed and reset.

6 Claims, 6 Drawing Sheets

(56) References Cited

U.S. PATENT DOCUMENTS

| | | | |
|---|---|---|---|
| 2006/0156617 A1* | 7/2006 | Hale | A01M 23/245 43/81 |
| 2009/0151224 A1* | 6/2009 | Nathan | A01M 23/24 43/81 |
| 2010/0162614 A1* | 7/2010 | Cink | A01M 25/004 43/58 |
| 2011/0072708 A1* | 3/2011 | Nathan | A01M 23/36 43/61 |
| 2011/0072709 A1* | 3/2011 | Patterson | A01M 31/002 43/81 |
| 2012/0174469 A1* | 7/2012 | Gardner | A01M 23/00 43/60 |
| 2014/0220859 A1* | 8/2014 | McCutchan | A01K 1/03 449/3 |
| 2017/0265452 A1* | 9/2017 | Leasure | A01M 23/26 |

FOREIGN PATENT DOCUMENTS

| | | | |
|---|---|---|---|
| DE | 102012013138 A1 * | 1/2014 | |
| DE | 102012013138 A1 * | 1/2014 | |

* cited by examiner

TELLTAIL RODENT TRAP

RELATED APPLICATION

This application claims the benefit of U.S. Provisional Application No. 62/497,681 filed in the USPTO on Nov. 29, 2016.

FIELD

This invention relates to a rodent trap system for tapping rodents in interior walls, ceilings and similar spaces that includes visible means of detecting when the trap has been sprung.

BACKGROUND

German OS DE 10-2012-013-138 A1 (2014) describes a rodent trap usable in wall and ceiling interiors which includes a strip that hangs from a wall or ceiling and disappears when the trap has been sprung. Besides being unsightly, the strip can be tampered with by pets or children which can cause the trap to prematurely spring without doing its job.

SUMMARY

The invention provides a telltale rodent trap system for trapping rodents in interior walls, ceilings and similar spaces. A cover plate which fits over an opening in a wall or ceiling has a telltale window or aperture that can be easily be seen from the inside of the room or interior space. A base plate is attached to the back of the cover plate and is sized to fit into the opening in the wall or ceiling. One aspect of the invention is to determine the location of an interior space being frequented by rodents (like mice in the ceiling or a wall) and creating the opening into which the base plate will fit and be covered by the cover plate.

Flexible lateral wings are attached to the rear or back-side of the base plate, made, for example, from two sections or one piece of 10 mil HDPE or similar plastic, can be folded towards and pass through the wall or ceiling opening and thereafter unfold against the back surface of the wall or ceiling to hold the trap system in place until it needs to be removed to extract a taped rodent. The cover plate can include a handle or similar means to facilitate removal although flexibility of the wings allows the cover plate to be pried up without a handle or similar means.

A conventional spring-loaded rodent trap (rat or mouse), or a "better mouse trap" such as described in U.S. Pat. No. 8,490,322 and sold under the trademark "Tomcat", is preferably releasably attached to the back of the base plate using, for example, "Velcro" or a similar hook and eye or nub systems. The trap is sized to fit thru the wall or ceiling opening and has a trap arm which pivots between a first position when the trap is set and a second position when the trap is sprung.

An elongated telltale is attached at one end to the pivoting trap arm and extends therefrom between the cover and base plates such that it is visible in the telltale window of the cover plate when the arm is in the set position and no longer visible when the arm is in the sprung position. In other words, the telltale is pulled away from the telltale opening when the pivot arm is released to spring the trap.

The telltale, which can be a strip of colored plastic or the like, has a first color, like blue or green, and the surface of the base plate under the telltale window has a different, preferably contrasting, second color, like red, or orange or so-called neon versions of red and orange. Thus when the second color is displayed in the telltale window, the homeowner is told that the trap has been sprung and it is time to remove the trap assembly and discard the trapped rodent (mouse, rat, vol and similar pesky animals). The trap can be rebated and set, or discarded and replaced by a new trap, and the assembly reinserted in the wall or ceiling opening to catch more rodents.

Prompt removal of a trapped rodent is essential to avoid decomposition and attendant unpleasant odors which can last for days and weeks. The disappearance of a dangling telltale strip can easily go unnoticed whereas the invention provides a positive and readily visible means that says remove the dead rat or mouse now.

The invention also provides a process for trapping rodents in interior walls, ceilings and similar spaces. The first step is to create an opening in a wall or ceiling to gain access to an interior space frequented by rodents. The opening should be between wall studs or ceiling rafters which can be located using known locating devices or by trial and error. Next is to provide a spring-loaded trap assembly as described above.

After baiting and setting the trap, the lateral wings are folded to insert the trap assembly into the wall or ceiling opening. The wings then unfold against the back surface of the wall or ceiling to hold the trap assembly in place.

An elongated telltale is attached and inserted between the cover and base plates as described above. When the telltale is no longer visible, indicating that the trap has been sprung, the trap assembly is removed or extracted from the wall or ceiling opening by causing the flexible wings to fold and allow the trap assembly to be removed.

The trap can be rebated and set, or discarded and replaced by a new trap, and the assembly reinserted in the wall or ceiling opening to catch more rodents.

DESCRIPTION OF THE DRAWINGS

The present invention will be more fully understood from the accompanying drawing and the following description wherein.

DESCRIPTION

Referring now to the preferred embodiment shown in FIGS. 1-4, the trap system is seen to include a cover plate 14 adapted to fit over an opening 12 in a wall or ceiling 10 which has a telltale window or opening aperture 16 visible from the outer side of cover plate 14. Base plate 18 is attached to the back of cover plate 14 and is adapted to fit into opening 12. Opening 12 can easily cut from drywall or similar wall or ceiling material, using a shop knife or saw after locating the studs or rafters 30.

Figure 3:
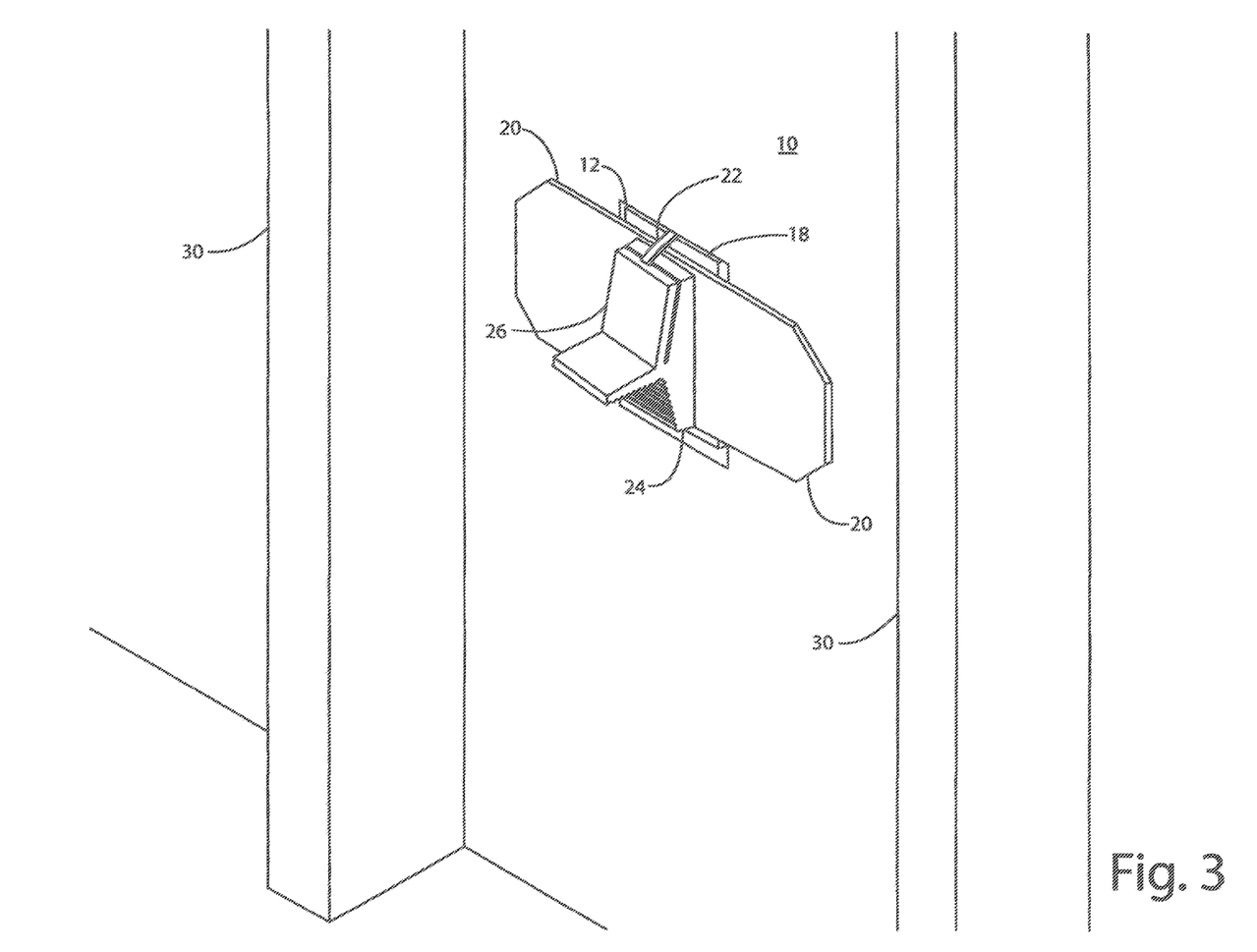
FIG. 3 is the same as FIG. 2 with both wings engaged and the trap in the set position.

Flexible lateral wings 20, shown in a preferred embodiment as a single piece of flexible plastic, are attached to the rear of base plate 18 and are adapted to fold towards and pass through opening 12 and thereafter unfold against the back surface of a wall or ceiling 10 to hold the trap system in place in opening 12 (FIG. 3).

Figure 2:
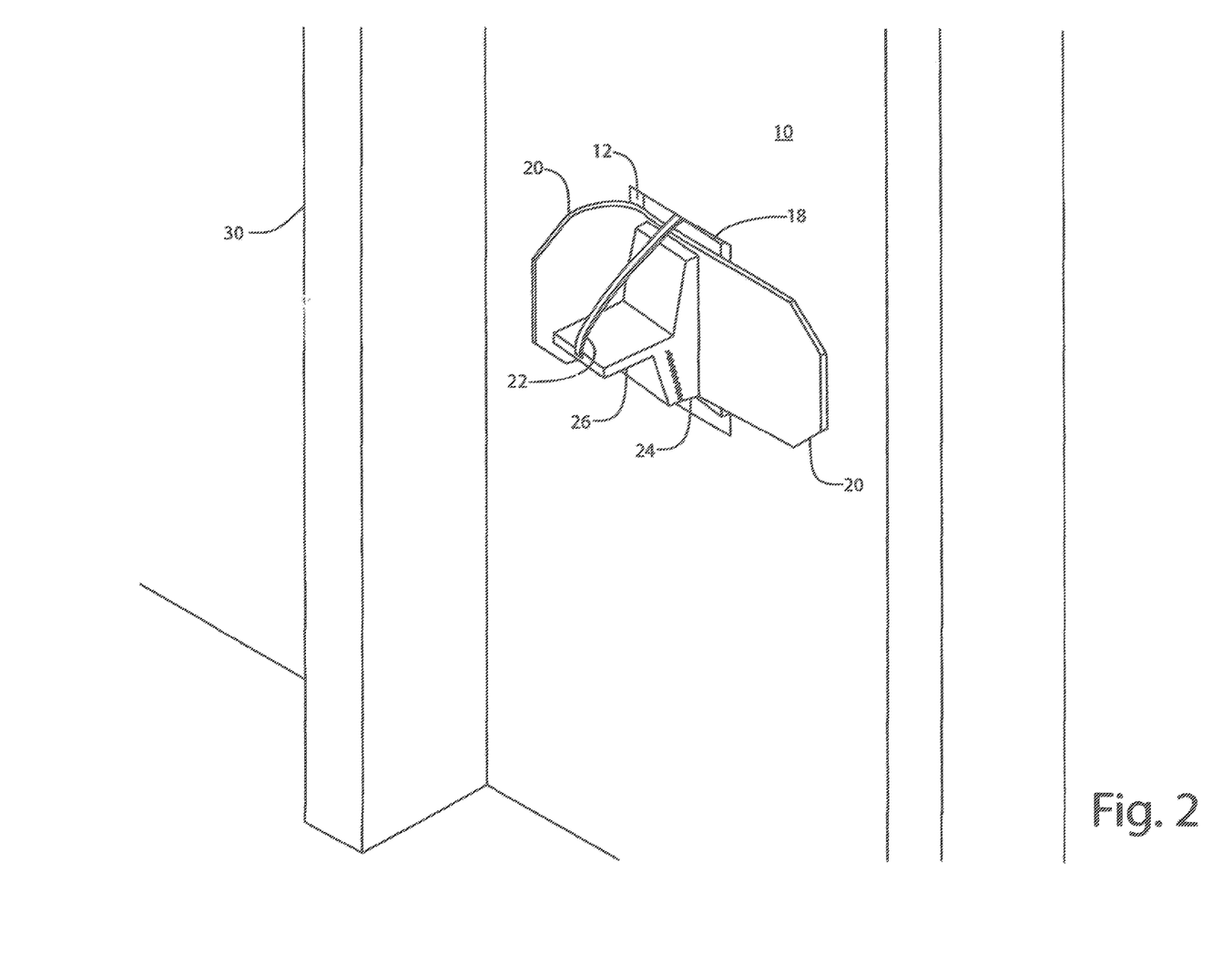
FIG. 2 is a perspective view of the trap assembly of FIG. 1 inserted into an interior space between wall or ceiling studs or rafters with the trap in the sprung position.

Spring-loaded trap 24 is preferably releasably affixed to the back of base plate 18 and is sized to fit through opening 12. Trap 24 has arm 26 adapted to pivot between a first position when the trap is set (FIG. 3) and a second position when the trap is sprung (FIG. 2).

Figure 4:
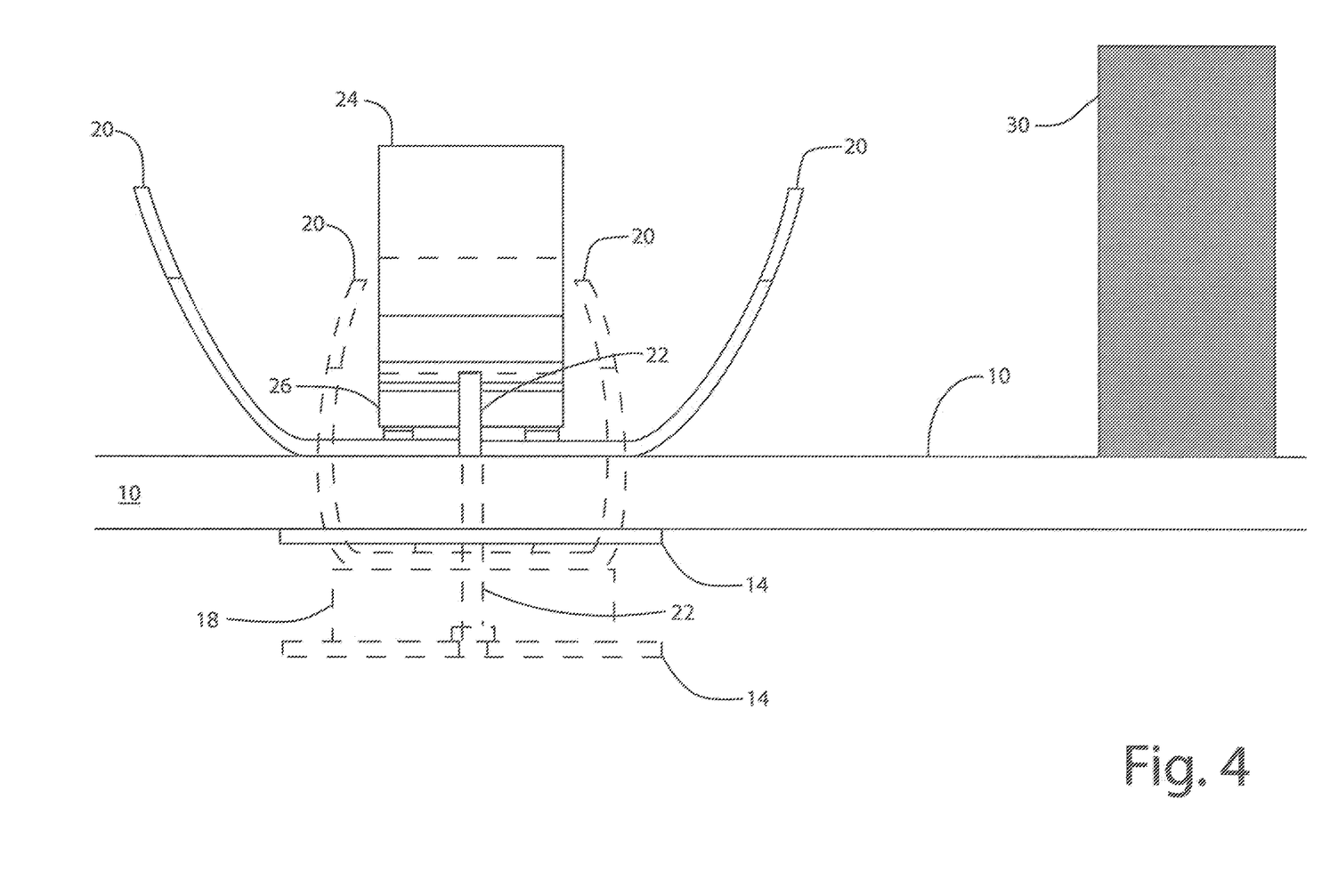
FIG. 4 is a composite sectional view showing the trap assembly with wings folded for insertion into a wall or ceiling opening and then partially unfolded on the way towards lying flat to hold the assembly in place.
Figure 5:
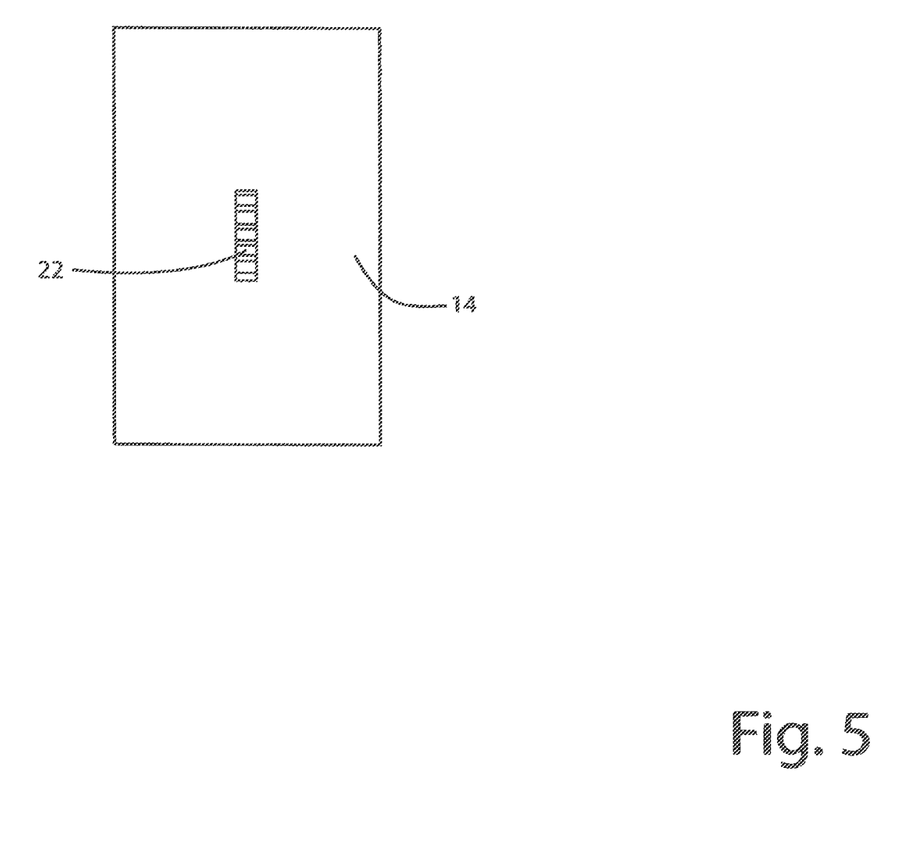
FIGS. 5 and 6 are plan views of a cover plate with a telltale window indicating a trap is set (FIG. 5) and when it has been sprung (FIG. 6).
Figure 6:
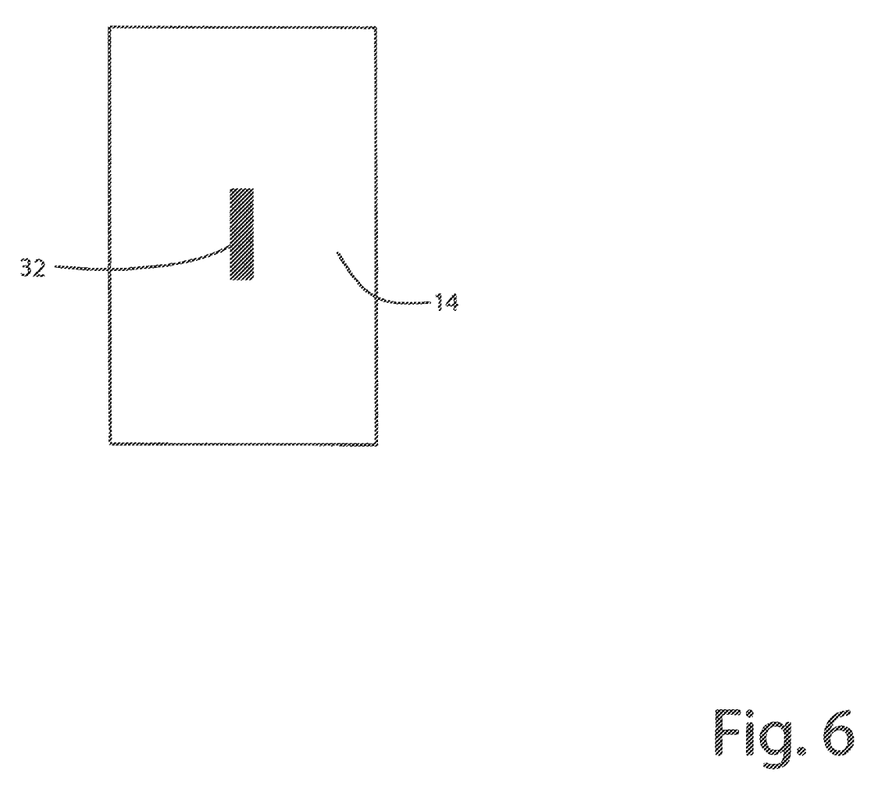

Elongated telltale 22 is attached at one end to trap arm 26 and extends therefrom between cover and base plates 14 and 18. Telltale 22 is visible in telltale window 16 when arm 26 is in the set position (FIG. 3) and no longer visible in window 16 when arm 26 is in the sprung position (FIG. 2). Telltale 22 is thus pulled away from telltale opening 16 when pivot arm 26 is released to spring the trap. Telltale 22 can simply lie on the surface of base 18 to be visible through window 16 or a slot or groove can be provided to position the telltale under window 16 (FIG. 4). See FIGS. 5 and 6.

Telltale 22, which can be a strip of colored plastic or the like, has a first color, like blue or green for example (FIG. 5), and the surface of base plate 18 under telltale window 16 has a different, preferably contrasting, second color 32 (FIG. 6), like red, or orange or the so-called neon versions of red and orange. Thus, when the second color is displayed in telltale window 16, the homeowner is told that the trap has been sprung and it is time to remove the trap assembly and discard the trapped rodent (mouse, rat, vol and similar pesky animals). Trap 24 can be rebated and set, or discarded and replaced by a new trap, and the assembly reinserted in the wall or ceiling opening to catch more rodents.

Figure 1A:
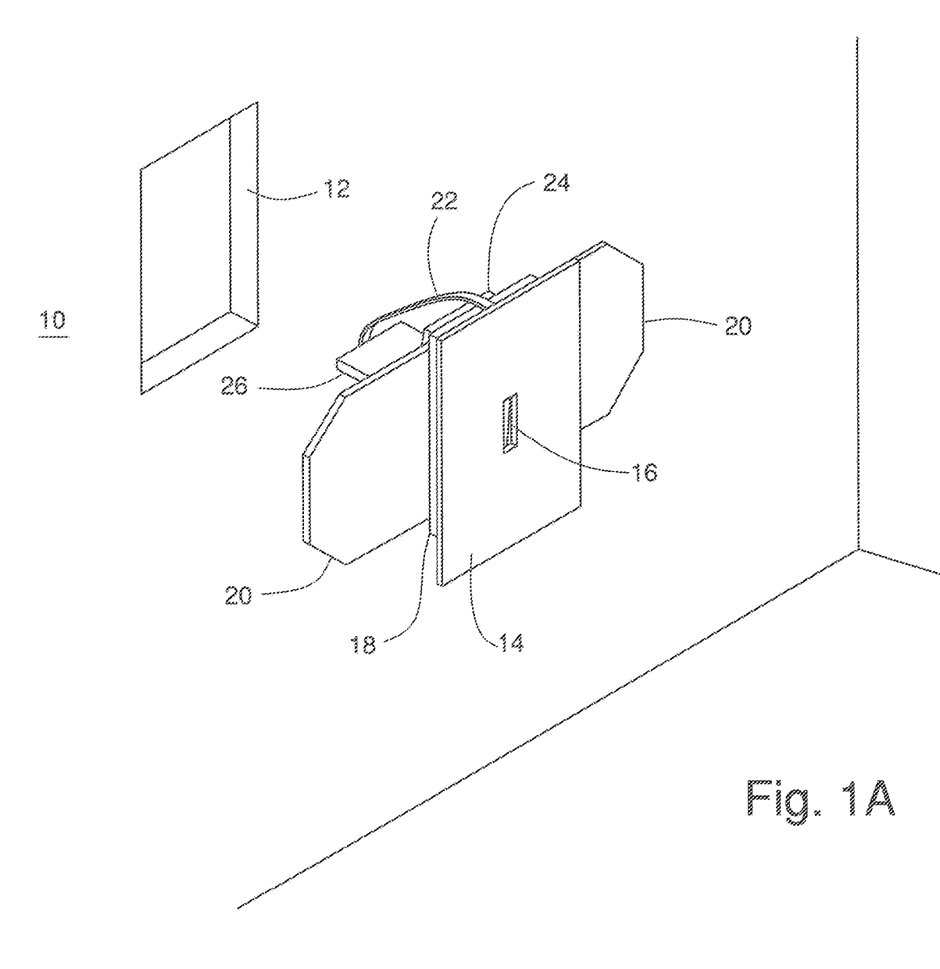
FIG. 1A is an exploded, perspective view of one embodiment of the trap system of the invention.
Figure 1B:
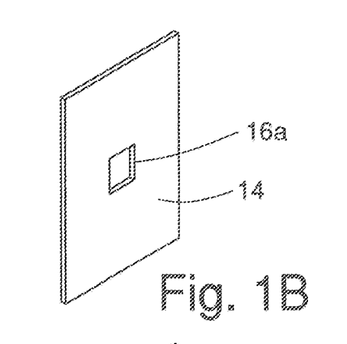
FIGS. 1B-1D are perspective views showing alternate embodiments of the telltale opening in the cover plate.
Figure 1C:
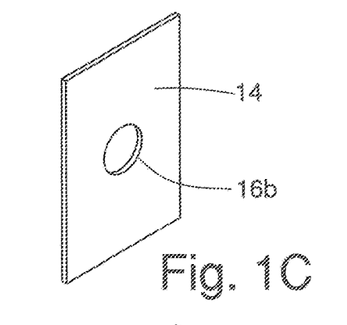
Figure 1D:
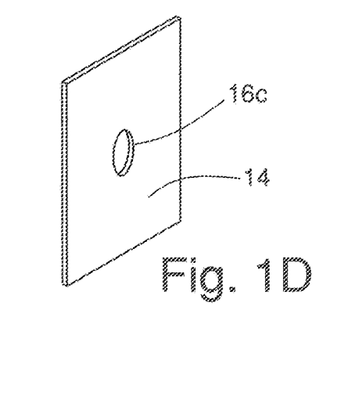

Telltale opening 16 can be rectangular as shown in FIG. 1A, and it can be any shape desired such as square (opening 16a in FIG. 1B), round (opening 16b in FIG. 1C), oval (opening 16c in FIG. 1D) or the like. Telltale 22 will then have a width sufficient to fill the window 16 when the trap is set.

What is claimed is:

1. A telltale rodent trap system for trapping rodents in a wall or ceiling of an interior space, said wall or ceiling having a back surface; the trap system comprising:
   a) a cover plate having an outer side facing said interior space and a back side, said cover plate being adapted to fit over an opening in said wall or ceiling and having a telltale aperture visible from said outer side;
   b) a base plate having a rear side and a front side attached to said back side of said cover plate, said front side having a surface under said telltale aperture, said base plate being adapted to fit into said opening;
   c) flexible lateral wings attached to said rear side of said base plate adapted to fold towards and pass through said opening and thereafter unfold against said back surface of said wall or ceiling to hold said trap system in said opening;
   d) a spring-loaded rodent trap affixed to said rear side of said base plate, said spring-loaded trap being sized to fit through said opening and having a trap arm adapted to pivot between a first position when said spring-loaded trap is set and a second position when said spring-loaded trap is sprung; and
   e) an elongated telltale extending from a first end thereof to a second end thereof and having a first color, said surface of said base plate under said telltale aperture having a different, contrasting second color, said first end attached to said trap arm, and said second end inserted between said cover plate and said base plate, such that said elongated telltale is visible in said telltale aperture when said trap arm is in said first position but no longer visible in said telltale aperture when said elongated telltale is pulled away from said telltale aperture by said trap arm pivoting to said second position, whereby said first color is visibly displayed in said telltale aperture to indicate said spring-loaded trap is set and said second color is visibly displayed in said telltale aperture to indicate said spring-loaded trap has been sprung.

2. The trap system of claim 1 wherein said spring-loaded trap is releasably affixed to said back surface.

3. The trap system of claim 1 wherein said elongated telltale is a strip of thin colored plastic.

4. The trap system of claim 1 wherein said elongated telltale has a width sufficient to fill said telltale aperture when said spring-loaded trap is set.

5. A process for trapping rodents in a wall or ceiling of an interior space, said wall or ceiling having a back surface; the process comprising:
   a) creating an opening in said wall or ceiling to gain access to space frequented by rodents;
   b) providing a telltale rodent trap system comprising
      i) a cover plate having an outer side facing said interior space and a back side, said cover plate being adapted to fit over said opening in said wall or ceiling and having a telltale aperture visible from said outer side;
      ii) a base plate having a rear side and a front side attached to said back side of said cover plate, said front side having a surface under said telltale aperture, said base plate being adapted to fit into said opening;
      iii) flexible lateral wings attached to said rear side of said base plate adapted to fold towards and pass through said opening and thereafter unfold against said back surface of said wall or ceiling to hold said trap system in said opening; and
      iv) a spring-loaded rodent trap affixed to said rear side of said base plate, said spring-loaded trap being sized to fit through said opening and having a trap arm adapted to pivot between a first position when said spring-loaded trap is set and a second position when said spring-loaded trap is sprung;
   c) baiting and setting said spring-loaded trap and folding said lateral wings to insert said trap system into said opening, said lateral wings unfolding against said back surface of said wall or ceiling to hold said trap system in said opening;
   d) providing an elongated telltale extending from a first end thereof to a second end thereof and having a first color, said surface of said base plate under said telltale aperture having a different, contrasting second color, said first end attached to said trap arm, and said second end inserted between said cover plate and said base plate, such that said elongated telltale is visible in said telltale aperture when said trap arm is in said first position, but no longer visible in said telltale aperture when said elongated telltale is pulled away from said telltale aperture by said trap arm pivoting to said second position, whereby said first color is visibly displayed in said telltale aperture to indicate said spring-loaded trap is set and said second color is visibly displayed in said telltale aperture to indicate said spring-loaded trap has been sprung; and e) removing said trap system from said opening when said spring-loaded trap has been sprung by causing said lateral wings to fold and allow said trap system to be removed from said opening.

6. The process of claim 5 further comprising:

f) removing a trapped rodent;

g) baiting and setting said spring-loaded trap and folding said lateral wings to insert said trap system into said opening, said lateral wings unfolding against said back surface of said wall or ceiling to hold said trap system in said opening;

h) removing said trap system from said opening when said spring-loaded trap has been sprung by causing said lateral wings to fold and allow said trap system to be removed from said opening.

* * * * *